April 7, 1936.  W. J. SARRINGAR  2,036,504
FLATIRON
Filed June 3, 1935
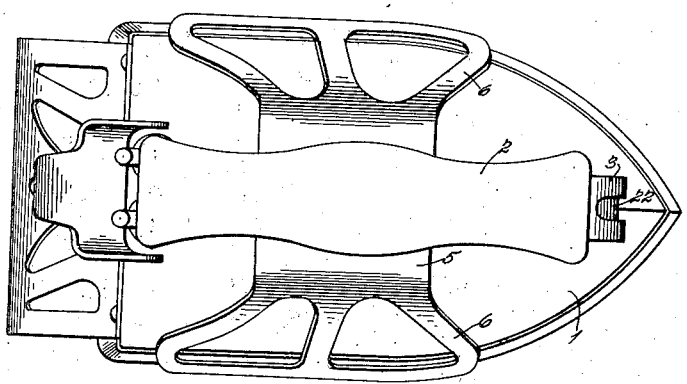
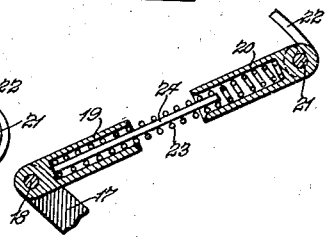
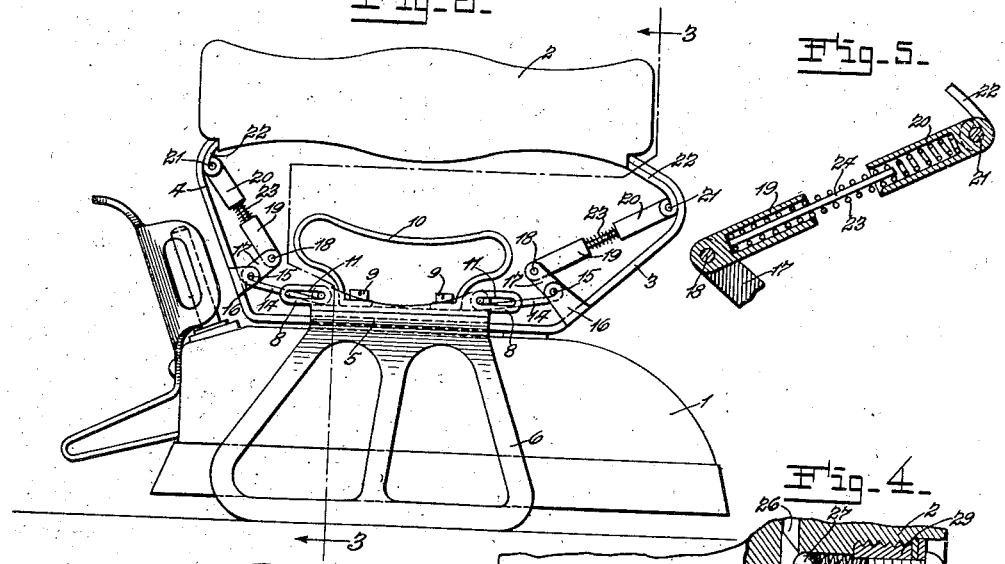
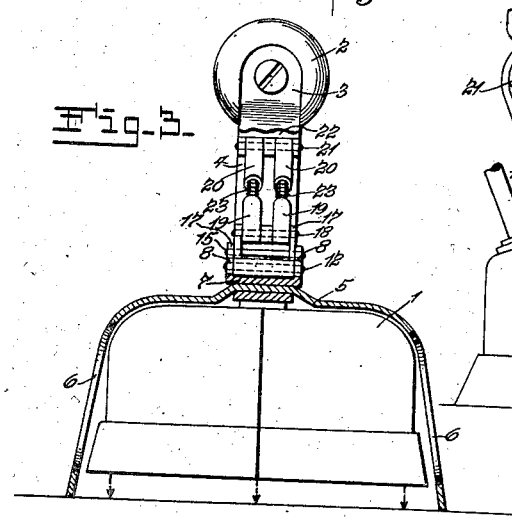
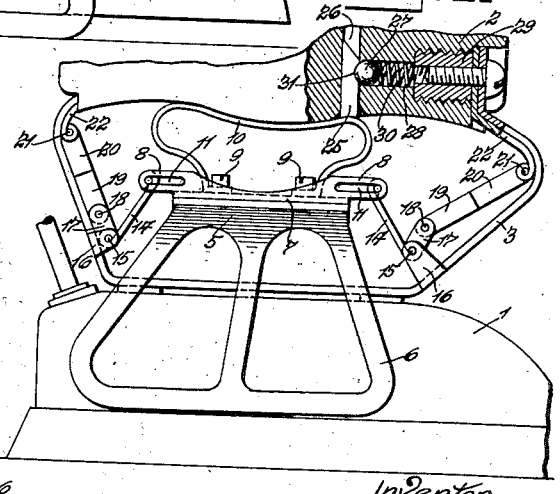
Inventor
William J. Sarringar
by Rippey & Cassidy
His Attorneys Patented Apr. 7, 1936

2,036,504

UNITED STATES PATENT OFFICE 2,036,504

FLATIRON

William J. Sarringar, St. Louis, Mo., assignor of fifty per cent to Louis N. Teitelbaum, St. Louis, Mo.

Application June 3, 1935, Serial No. 24,599

5 Claims. (Cl. 68—26)

This invention relates to flatirons, and is of general utility whether applied to flatirons heated by electricity or otherwise.

An object of the invention is to provide a frame mounted on the flatiron and having resilient pivotal connections with the handle of the flatiron, which operate and function to raise the flatiron into the frame and out of contact with the support or fabrics upon which the flatiron is mounted when the flatiron is not in use.

Another object of the invention is to provide means for latching the frame in raised position at the option of the user.

Other objects will be apparent from the following description, reference being made to the annexed drawing in which—

Fig. 1 is a plan view of the invention in connection with a conventional flatiron;

Fig. 2 is a side elevation of the device in connection with a flatiron;

Fig. 3 is a sectional view on the irregular section line 3—3, Fig. 2;

Fig. 4 is a side elevation with parts in section showing the latching loops for holding the frame in its raised position; and Fig. 5 is an enlarged sectional view of one of the resilient pivotal conections for raising the flatiron in the frame.

As shown in Figs. 1, 2 and 3, the flatiron 1 is an electric flatiron and is provided with the usual handle 2 attached to the flatiron by a handle frame including a front portion 3 and a rear portion 4.

The supporting frame for the flatiron comprises a central portion 5 extending across the top of the flatiron between the handle frame portions 3 and 4 and a downwardly extended portion 6 attached to or in connection with the frame portion 5 at each side of the flatiron. The portions 6 are of sufficient length to extend substantially below the lower surface of the flatiron when the portion 5 is seated against the handle frame member that extends along the top of the flatiron.

A bracket comprising a longitudinal portion 7, and upwardly and longitudinally extended portions 8 in connection with the opposite ends of said portion 7, is rigidly attached to the upper surface of the frame portion 5 by removable and replaceable fastening screws 9, which also rigidly attach a handle loop 10 to the frame portion 5. The two upwardly and longitudinally extended portions 8 at each end of the bracket have longitudinal slot 11 therethrough which receive the ends of a pin or small rod 12 around which the forward end 13 of a lever arm 14 is rolled. The lever arm 14 at each end of the device extends between the upwardly extended portions 8 and is guided by said portions 8 during operation of the lever arm. The outer ends of the lever arms 14 are mounted on pivots 15 supported by brackets 16 rigid with the handle frame portions 3 and 4 respectively. The outer ends of the lever arms 14 are in rigid connection with arms 17 which extend angularly from the arms 14. The arms 17 at each end of the device support a pivot 18. A spring supporting socket 19 has its inner end mounted on each pivot 18. Spring supporting sockets 20 have their outer ends mounted on pivots 21 carried by rigid supports 22.

A coil spring 23 is mounted in the pair of sockets 19 and 20 at each end of the device and due to the angularity of the arms 17 the energy of these springs 23 is utilized to force the frame 5, 6 downwardly, or to raise the flatiron so that the lower edges of the frame portions 6 extend substantially below the lower surface of the flatiron and will support the flatiron well above the fabric or other support upon which the device is mounted. A rod 24 has its inner end mounted or secured in each of the spring sockets 19 and extends across the space between the sockets 19 and 20 and into the sockets 20 and functions as a retainer for the spring 23 which encircles said rod. The rod 23 does not interfere with the raising and lowering of the frame 6 but prevents the spring 23 from working out of either of the sockets or otherwise becoming disarranged.

In this construction and arrangement of the parts the springs 23 operate automatically to lower the frame 5, 6, and to raise the flatiron when the handle 10 is released. In using the device some of the fingers of the operator are passed through the handle loop 10 and are gripped about the handle 2, thereby raising the frame 5, 6 and at the same time pressure is applied against the handle 2 to work the flatiron along the fabric that is being ironed.

In the arrangement shown in Fig. 4 a latch detent 25 is attached to one end portion of the handle loop portion 10 for vertical sliding movements in a socket 26 in the handle 2. A ball latch 27 is mounted in a cavity 28 in the handle 2 and retained therein by a plug 29. The ball is actuated inwardly by a spring 30 and when the handle loop 10 is seated against the underside of the handle 2 the ball 27 engages in a notch 31 in the latch detent 25 and thereby supports the frame 5, 6, notwithstanding the pressure applied thereto by the spring 23. In this construction it is necessary that the operator apply some pressure against the upper side of the frame 5, 6, sufficient to disengage the detent 25 from the latch ball 27 whereupon the springs 23 will raise the iron above the lower edges of the supporting frame 5, 6.

This device may be manufactured and assembled in connection with flatirons of different types at comparatively low expense, and is effective to raise and support the flatiron above and out of contact with the fabric being ironed or the support upon which the flatiron is mounted, automatically and as an incident to the detachment of the fingers of the operator from engagement with the handle loop 10.

The device may be varied within the scope of equivalent limits without departing from the nature and principle of the invention.

I claim:

1. The combination with a flatiron having longitudinally spaced handle portions, of a frame extending transversely of the flatiron between said handle portions and downwardly at the sides of the flatiron, levers pivotally connected with said frame between said spaced handle portions, and springs between said handle portions and interposed between said handle portions and said levers and actuating said levers in a direction to press said frame downwardly to position in which said frame extends beyond the lower surface of the flatiron.

2. The combination with a flatiron having longitudinally spaced handle portions and a handle attached to said handle portions, of a frame extending transversely of the flatiron between said handle and the flatiron, angular levers pivotally connecting said frame with said handle portions, springs for actuating said levers in directions to move said frame downwardly toward the flatiron and to extend the lower surface of said frame downwardly beyond the lower face of the flatiron, and means connected with said levers and with said handle portions preventing displacement of said springs.

3. The combination with a flatiron having longitudinally spaced handle frame portions extending downwardly therefrom and a handle attached to said frame portions, of a frame extending between said frame portions transversely of the flatiron and downwardly at opposite sides of the flatiron, levers pivotally connected with said frame between said handle frame portions, and springs between said handle frame portions and interposed between said handle frame portions and said levers and acting on said levers to actuate said frame downwardly with respect to the flatiron.

4. The combination with a flatiron having longitudinally spaced handle frame portions and a handle attached to said handle frame portions, of a frame extending transversely of the flatiron between said handle frame portions and downwardly at the sides of the flatiron, angular levers pivotally connecting said frame with said handle frame portions and having slidable connection with said frame, springs for actuating said frame downwardly toward the flatiron, and means for preventing displacement of said springs.

5. The combination with a flatiron having longitudinally spaced handle frame portions in connection therewith and a handle attached to said handle frame portions, of a frame extending transversely of the flatiron between said handle frame portions and downwardly at opposite sides of the flatiron, coiled springs mounted between said handle frame portions and said frame, angular levers connected with said frame and said springs and operated by said springs to move said frame downwardly toward the flatiron, and means for supporting and preventing displacement of said springs.

WILLIAM J. SARRINGAR.